United States Patent
Nagata et al.

[11] Patent Number: 5,968,214
[45] Date of Patent: Oct. 19, 1999

[54] AIR CLEANING APPARATUS FOR VEHICLES

[75] Inventors: Yoshihiro Nagata; Shigetomo Noda, both of Hirakata; Shinichi Hara, Kounan-cho; Toshio Harada, Kounan-cho; Tadakazu Ono, Kounan-cho; Tsutomu Kimura, Kounan-cho; Teruaki Yamaguchi, Kounan-cho; Toshinori Sugiki, Kounan-cho, all of Japan

[73] Assignees: Komatsu Ltd.; Zexel Corporation, both of Tokyo, Japan

[21] Appl. No.: 08/967,059

[22] Filed: Nov. 10, 1997

[30] Foreign Application Priority Data

Nov. 14, 1996 [JP] Japan ................................. 8-318822

[51] Int. Cl.⁶ .................................................. B01D 53/34
[52] U.S. Cl. ............................ 55/385.3; 55/522; 55/524; 55/527; 423/239; 423/244; 423/247
[58] Field of Search .................................. 55/385.3, 522, 55/524, 527; 502/60, 401, 411, 413, 414; 423/239, 244, 247; 355/30

[56] References Cited

U.S. PATENT DOCUMENTS

| | | | |
|---|---|---|---|
| 4,003,979 | 1/1977 | Kanno | 423/239 |
| 5,212,131 | 5/1993 | Belding | 502/60 |
| 5,434,644 | 7/1995 | Kitano et al. | 355/30 |
| 5,454,845 | 10/1995 | Anahara et al. | 55/527 |
| 5,500,271 | 3/1996 | Pasch et al. | 55/522 |

FOREIGN PATENT DOCUMENTS 403275065 12/1991 Japan ................................... 55/385.3

*Primary Examiner*—Jay H. Woo
*Assistant Examiner*—Minh-Chau T. Pham
*Attorney, Agent, or Firm*—Wenderoth, Lind & Ponack, L.L.P.

[57] ABSTRACT

An air cleaning apparatus for vehicles includes an ozone generator, diffusing plate, and activated charcoal filter, which are disposed sequentially from the upstream side of air flow in an air cleaning duct. The activated charcoal filter contains acid treated activated charcoal and alkali treated activated charcoal. Thus, in the air cleaning apparatus for vehicles, the ozone generator oxidizes ammonia and acetaldehyde and then absorbs and removes the products by acid activated charcoal and alkali activated charcoal. As a result, ammonia, acetaldehyde and acetic acid which are bad odor components of cigarette smoke can be removed sufficiently and effectively.

10 Claims, 10 Drawing Sheets

$K_1$ = durable number of ammonia $K_2$ = durable number of acetaldehyde $K_3$ = durable number of acetic acid total durable number $K = \dfrac{K_1 + 2K_2 + K_3}{4}$

AIR CLEANING APPARATUS FOR VEHICLES

BACKGROUND OF THE INVENTION

The present invention relates to an air cleaning apparatus for vehicles, provided in an air conditioning duct of a vehicle for cleaning air in the vehicle to remove contaminant, particularly, cigarette smoke in a vehicle compartment.

Generally, an air cleaning apparatus used in a vehicle such as automobile, for cleaning air in a vehicle compartment has been known in the prior art. Such an air cleaning apparatus is provided in, for example, an air conditioning duct and cleans air by removing contaminant from the air in the vehicle compartment when the air circulates therein.

On the other hand, contaminant of air in the compartment includes not only fine particles and dust, but also cigarette smoke. In recent years, deodorization of bad odor of cigarette smoke has been strongly demanded in particular. Such an art in which an activated charcoal filter is disposed in an air passage so as to remove smoking odor by absorbing the odor thereto has been known.

However, cigarette smoke contains bad odor substances such as ammonia, acetic acid and acetaldehyde. Although a conventional activated charcoal filter is capable of removing acetic acid to some extent, it is not capable of removing ammonia and acetaldehyde. Thus, the conventional activated charcoal filter does not have a sufficient deodorizing effect.

Although an art of removing ammonia by neutralizing reaction by treating the activated charcoal with acid can be considered, it is not possible to obtain a sufficient deodorization effect even if this art alone is employed.

SUMMARY OF THE INVENTION

Accordingly, it is an object of the present invention to provide an air cleaning apparatus for vehicles, which is capable of deodorizing cigarette smoke odor sufficiently.

According to the present invention, there is provided an air cleaning apparatus for vehicles the apparatus comprising: an air passage; an ozone generator disposed in the air passage; and an activated charcoal filter disposed in a downstream side of the ozone generator in the air passage, the activated charcoal filter containing acid activated charcoal in which activated charcoal is treated by acids and alkali activated charcoal in which activated charcoal is treated by alkali.

According to the aforementioned air cleaning apparatus for vehicles, as ozone is generated by the ozone generator in the air passage of a vehicle, ammonia which is a bad odor component of smoking is oxidized. Acetaldehyde which is a bad odor component of smoking is oxidized by the ozone to transform to acetic acid. Such oxidized ammonia and acetaldehyde become easy to absorb and remove by means of the activated charcoal so that they are absorbed by activated charcoal disposed in the downstream side of the ozone generator. Further, not non-neutralized or non-oxidized odor components of smoking are absorbed securely by acid treated activated charcoal and alkali treated activated charcoal, so that the odor component of smoking can be removed sufficiently.

In the air cleaning apparatus for vehicles according to the present invention, it is permissible to dispose a diffusing means for diffusing the generated ozone in the air passage in the downstream side of the ozone generator and in the upstream side of the activated charcoal filter. This prevents ozone generated in the air passage from being deposited, so as to diffuse the ozone substantially equally throughout the air passage thereby absorbing the odor components of smoking diffusedly in a wide region of the activated charcoal filter.

Here, the diffusing means may be a plate-like member having a plurality of holes, so as to make passing air turbulent, thereby mixing air with the ozone.

Further, in the air cleaning apparatus for vehicles according to the present invention, the activated filter may be formed of a combination of a first layer containing alkali activated charcoal and a second layer containing acid activated charcoal. As a result, the alkali activated charcoal and acid activated charcoal are uniformly disposed in a single activated charcoal filter for air passing therethrough to be capable of contacting equally both the activated charcoal components.

To facilitate production thereof, the first and second layers of the activated charcoal filter may be formed by bonding the alkali activated charcoal and acid activated charcoal on the surfaces of the substrates thereof.

Further, formation of the through portions in the activated charcoal filter along the direction of air flow is preferred to reduce ventilation resistance.

To provide these through portions, for example, it is permissible to form the activated charcoal filter by overlaying combinations of a flat substrate and a corrugated substrate disposed on a main surface of the flat substrate so as to form the through portion between the flat substrate and the corrugated substrate, in the form of plural layers.

Further, by forming the activated charcoal filter in a honey-comb structure, it is possible to provide the through portions while maintaining a strength.

The activated charcoal filter may be formed of a combination of a first block containing acid activated charcoal and a second block containing alkali activated charcoal in the same manner that it is formed of the combination of the first and second layer mentioned above.

To further facilitate production thereof, the activated charcoal filter may be formed by a bonding mixture of acid activated charcoal and alkali activated charcoal to a surface of the substrate thereof.

DESCRIPTION OF THE PREFERRED EMBODIMENTS

Hereinafter, an embodiment of the present invention will be described in detail with reference to the accompanying drawings.

Figure 1:
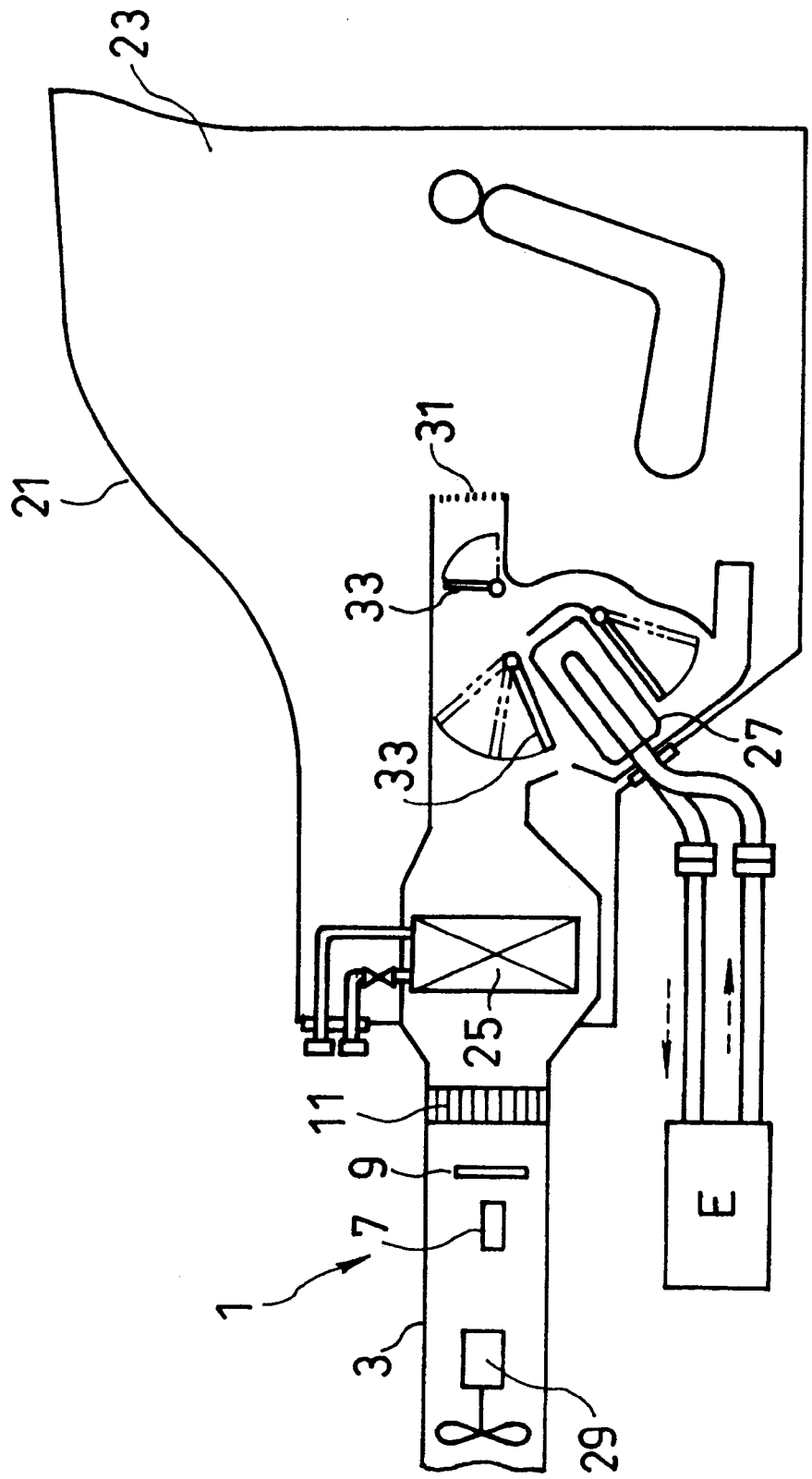
FIG. 1 is a schematic view showing an outline of a vehicle provided with an air cleaning apparatus according to an embodiment of the present invention.

As shown in FIG. 1, an air cleaning apparatus 1 according to the present invention is disposed in an air conditioning duct 3 for circulating air in a compartment 23 of a vehicle 21 together with a heat exchanger such as an evaporator 25 and a heater 27. The air cleaning apparatus 1 is structured to remove dust and odor from the air circulating in the compartment 23 in cooperation with the heat exchanger, and adjust the temperature of the compartment 23. Reference numeral 29 in FIG. 1 denotes a blower provided at an entrance of the air conditioning duct 3. Reference numeral 31 denotes an air outlet provided at an outlet side of the air conditioning duct 3. Reference numeral 33 denotes a door for restricting air flow.

Figure 2:
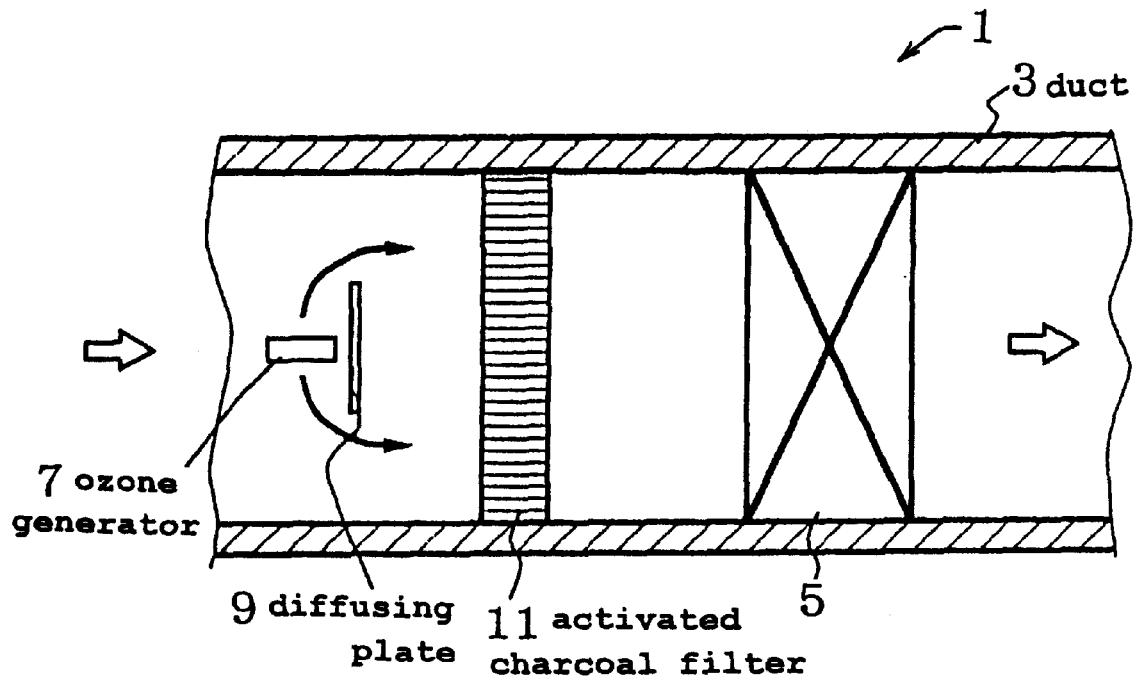
FIG. 2 is a sectional view showing a schematic structure of the air cleaning apparatus according to an embodiment of the present invention.

FIG. 2 shows schematically the air conditioning apparatus according to a first embodiment. The air cleaning apparatus 1 comprises an ozone generator 7, a diffusing plate 9 for diffusing ozone generated by the ozone generator 7 and an activated charcoal filter 11 for absorbing dust and bad odor in air by means of the activated charcoal, these components being disposed in the upstream side of the heat exchanger 5 in the air conditioning duct 3, sequentially from the upstream side thereof.

The ozone generator 7 produces ozone by transforming oxygen in air. Although the ozone generator 7 is not restricted to any particular type, for example, a surface creepage type, in which electrodes are provided on both surfaces of a ceramic plate and AC high voltage is applied thereto so as to induce discharge thereby producing ozone, or a corona discharge type are available.

Figure 3:
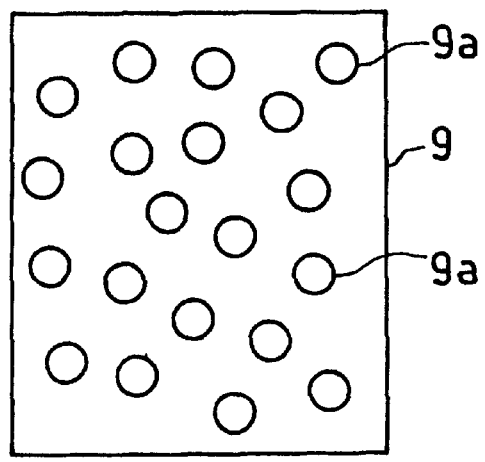
FIG. 3 is a plan view showing a structure of an activated charcoal filter.

The diffusing plate 9 is disposed in the downstream side of the ozone generator 7. The shape of the diffusing plate 9 includes, for example, a flat type, a circular type and a curved type which is curved toward the side of the ozone generator 7. As shown in FIG. 3, it is permissible to provide the diffusing plate 9 with a plurality of small holes 9*a* so as to disturb the air passing therethrough, thereby mixing the air and the ozone.

Although the activated charcoal filter 11 is not restricted to any particular type, the filter contains acid activated charcoal processed by acid and alkaline activated charcoal processed by alkali, so that both acid odor and alkali odor can be absorbed.

The acid activated charcoal and alkali activated charcoal are obtained by immersing the activated charcoal in an acid reagent such as phosphoric acid, hydrochloric acid as inorganic salt and citric acid as organic salt, and an alkali reagent such as sodium hydrate, sodium carbonate as an inorganic salt and aromatic amine as organic salt, respectively so as to transform the surface of the activated charcoal to acid or alkali. Therefore, the acid activated charcoal and alkali activated charcoal have a chemical absorbing characteristic as well as a physical absorbing characteristic inherent of the activated charcoal. More specifically, acid gas causes a neutralizing reaction with the alkali activated charcoal and, on the other hand, alkali gas causes a neutralizing reaction with the acid activated charcoal, thereby deodorizing the bad odor components.

Figure 4:
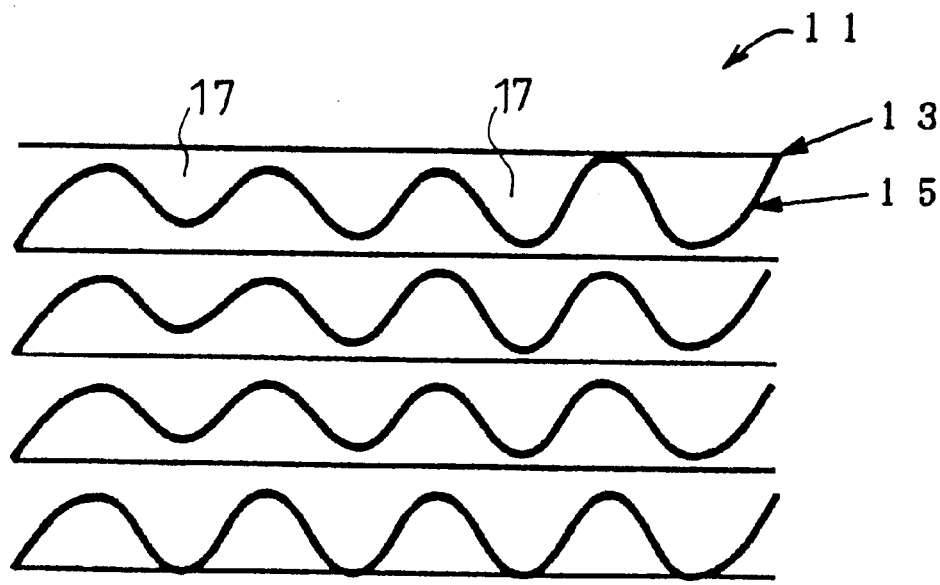
FIG. 4 is a plan view showing a structure of the activated charcoal filer.

The activated charcoal filter 11 is preferred to have through portions extending in a direction in which air passes in order to reduce ventilation resistance. For example, as shown in FIG. 4, the activated charcoal filter 11 may include plural overlaid combined strata each comprising a first layer in flat form having alkali activated charcoal (hereinafter referred to as alkali treated activated charcoal layer) 13 and a second layer in corrugated form having acid activated charcoal (hereinafter referred to as acid treated activated charcoal layer) 15. Consequently, the alkali treated activated charcoal and acid treated activated charcoal are disposed uniformly on the single activated charcoal filter so that they are capable of contacting air through their entire regions.

Figure 5:
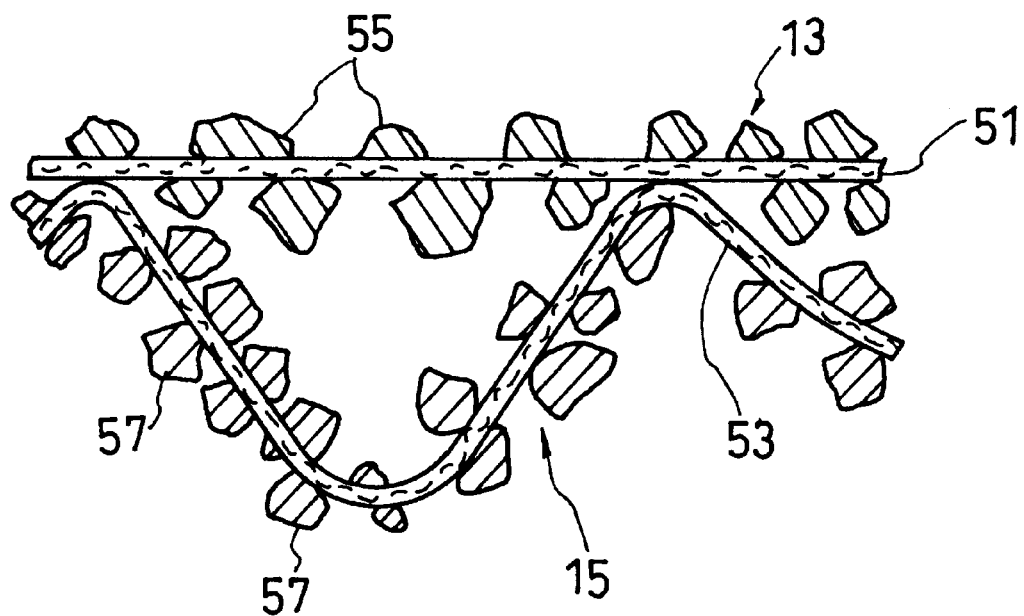
FIG. 5 is a sectional view showing an activated charcoal layer composing the activated charcoal filter.

Here, the alkali treated activated charcoal layer 13 and acid treated activated charcoal layer 15, as shown in FIG. 5, are obtained by bonding alkali activated charcoal 55 and acid activated charcoal 57, which are treated with alkali and acid respectively, on the surfaces of substrates 51 and 53 made of paper or the like with adhesive agent.

In this case, by disposing the alkali treated activated charcoal layer 13 and the acid treated activated charcoal layer 15 alternately, these two activated charcoal layers can be combined with a simple structure. As this activated charcoal filter 11 has the through portions 17 extending along the air passing direction in the activated filter 11, the through portions being disposed between the first layer 13 and the second layer 15, the ventilation resistance can be reduced.

Figure 6:
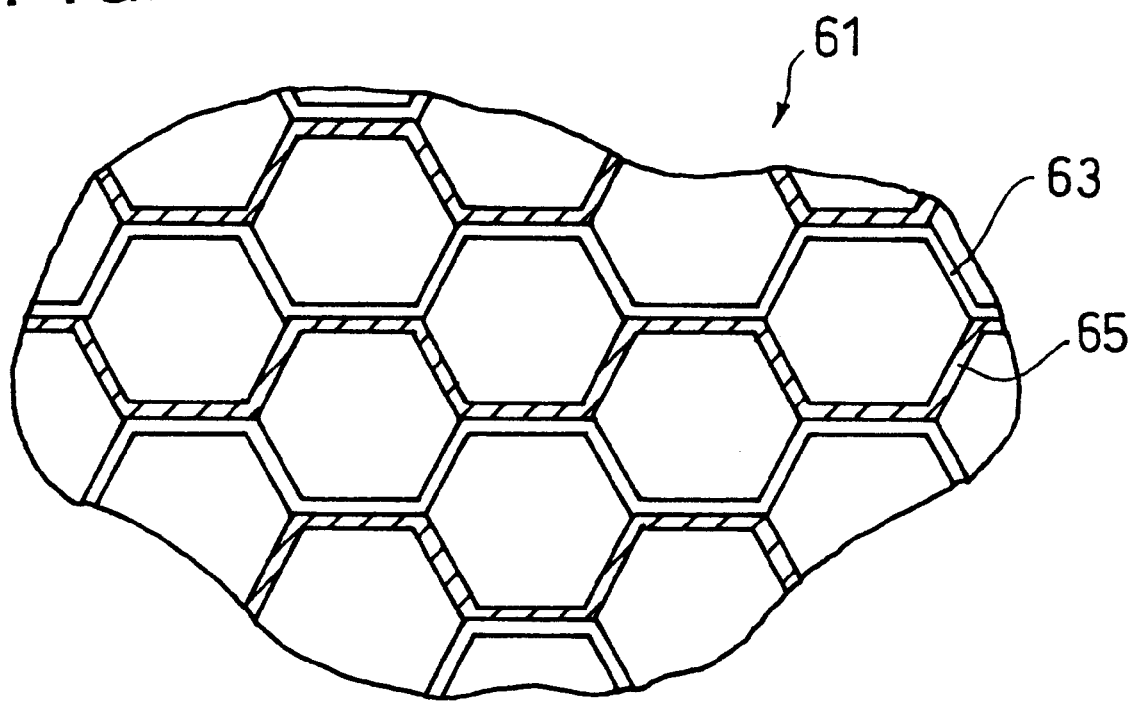
FIG. 6 is a plan view showing a structure of the honeycomb structure activated charcoal filter.

Further, as shown in FIG. 6, this activated charcoal filter can utilize a honey-comb activated charcoal filter 61 which assures a high strength and a low ventilation resistance. The honey-comb activated charcoal filter 61 is structured by repeating a combination of the alkali treated activated charcoal layer 63 and acid treated activated charcoal layer 65 like the filter 11 shown in FIG. 4.

Although the activated charcoal filter 11 is structured of the combinations of the alkali treated activated charcoal layers 13 and 63 and acid treated activated charcoal layers 15 and 65 as described above, it is permissible to utilize a mixed activated charcoal layer formed by bonding mixture of the acid activated charcoal and alkali activated charcoal on the surface of a substrate. In this case, it is possible to provide a single layer with absorption functions of the acid activated charcoal and alkali activated charcoal.

Next, an operation of this embodiment will be described. First, odor component in cigarette smoke will be explained. Table 1 shows a result of measurement on concentrations of each of components generated per cigarette in a box of 1 $m^3$ under the ambient temperature of 25° C. and humidity of 40%. That is, the generation concentration of ammonia (molecular formula: $NH_3$) which is a basic component is 4.0 ppm, that of acetaldehyde (molecular formula: $CH_3CHO$) is 1.0 ppm and that of acetic acid (molecular formula: $CH_3COOH$) which is an acid component is 1.5 ppm.

TABLE 1

| Name | Molecular formula | Generation concentration |
| --- | --- | --- |
| Ammonia (basic) | $NH_3$ | 4.0 ppm |
| Acetaldehyde (neutral) | $CH_3CHO$ | 1.0 ppm |
| Acetic acid (acid) | $CH_3COOH$ | 1.5 ppm |

Generation concentration per cigarette in a box of 1 m³ (25° C., 40% RH)

As evident from the measured values shown in Table 1, the odor components of smoking include a number of basic, neutral and acid components such as ammonia, acetaldehyde and acetic acid. Thus, by removing all these components, the bad odor of smoking can be removed sufficiently.

Cigarette smoke containing the aforementioned various odor components passes through the air conditioning duct 3 equipped with the air cleaning apparatus 1 according to this embodiment shown in FIG. 2. In this air conditioning duct 3, ozone ($O_3$) is generated by the ozone generator 7. Acetaldehyde and ammonia are oxidized by the ozone so as to transform into substance easy to remove by the activated charcoal filter 11. For example, acetaldehyde is oxidized by the ozone according to the reaction formula (1) below so as to transform to acetic acid. This acetic acid can be removed easily by alkali treated activated charcoal, which will be described later.

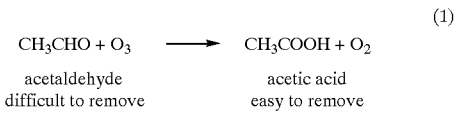

$$CH_3CHO + O_3 \longrightarrow CH_3COOH + O_2 \quad (1)$$

acetaldehyde (difficult to remove) → acetic acid (easy to remove)

In a process of oxidization of the odor components by the ozone, the ozone generated by the ozone generator 7 is diffused almost equally over the entire sectional area perpendicular to the air flow direction in the air conditioning duct 3 by means of the diffusing plate 9. Consequently, it is possible to make the ozone sufficiently act upon the odor components spread within the air conditioning duct 3. Further, as the ozone is mixed with air passing through the air conditioning duct 3 by means of the diffusing plate 9, the oxidization by the ozone is accelerated so that the bad odor can be oxidized effectively by the ozone. Further, due to the diffusion of air by the diffusing plate 9, the odor components make equal contact with an entire sectional area of the activated charcoal filter 11 disposed in the downstream side of the diffusing plate 9. Consequently, local action of the odor components upon the activated charcoal filter 11 is prevented so that the service life of the activated charcoal filter 11 is extended. Further, it is not necessary to dispose the ozone generator 7 and activated charcoal filter 11 with a sufficient distance therebetween in order to achieve diffusion of the ozone and mixing with air. Thus, the distance therebetween can be minimized so that the air cleaning apparatus can be structured in a compact configuration.

Then, the odor components oxidized by the ozone in the above manner are absorbed and removed by the activated charcoal filter 11. In the activated charcoal filter 11, of the odor components in the cigarette smoke, the oxidized ammonia is absorbed by mainly the acid treated activated charcoal layer 13. On the other hand, the acetic acid is absorbed by mainly the alkali activated charcoal layer 15. Further, the acetic acid obtained by oxidizing acetaldehyde with ozone is absorbed by the alkali treated activated charcoal layer 15 in the same manner.

Table 2 shows a relation between the kind of the activated charcoals and absorption about ammonia, acetaldehyde and acetic acid. Double circles in the Table 2 indicate that the absorption and removal is very excellent and a single circle indicates good, a triangle indicates not good and a cross mark indicates that sufficient removal is not performed. Then, A indicates not treated activated charcoal, B indicates acid treated activated charcoal, C indicates alkali treated activated charcoal, B+C indicates mixture of acid treated activated charcoal and alkali treated activated charcoal, and B+C+$O_3$ indicates that acid treated activated charcoal and alkali treated activated charcoal are mixed on the activated charcoal filter under a presence of ozone.

TABLE 2

| | Kind of activated charcoal | | | | |
| --- | --- | --- | --- | --- | --- |
| gas | A not treated activated charcoal | B Acid treated activated charcoal | C alkali treated activated charcoal | B + C | B + C + $O_3$ |
| ammonia | X | ⊚ | X | ○ | ⊚ |
| acetaldehyde | Δ | Δ | X | Δ | ○ |
| acetic acid | Δ | X | ⊚ | ⊚ | ⊚ |

As evident from Table 2, in a case when "B+C+$O_3$," or the ozone, acid treated activated charcoal and alkali treated activated charcoal were used, ammonia, acetaldehyde and acetic acid could be removed sufficiently.

Figure 7:
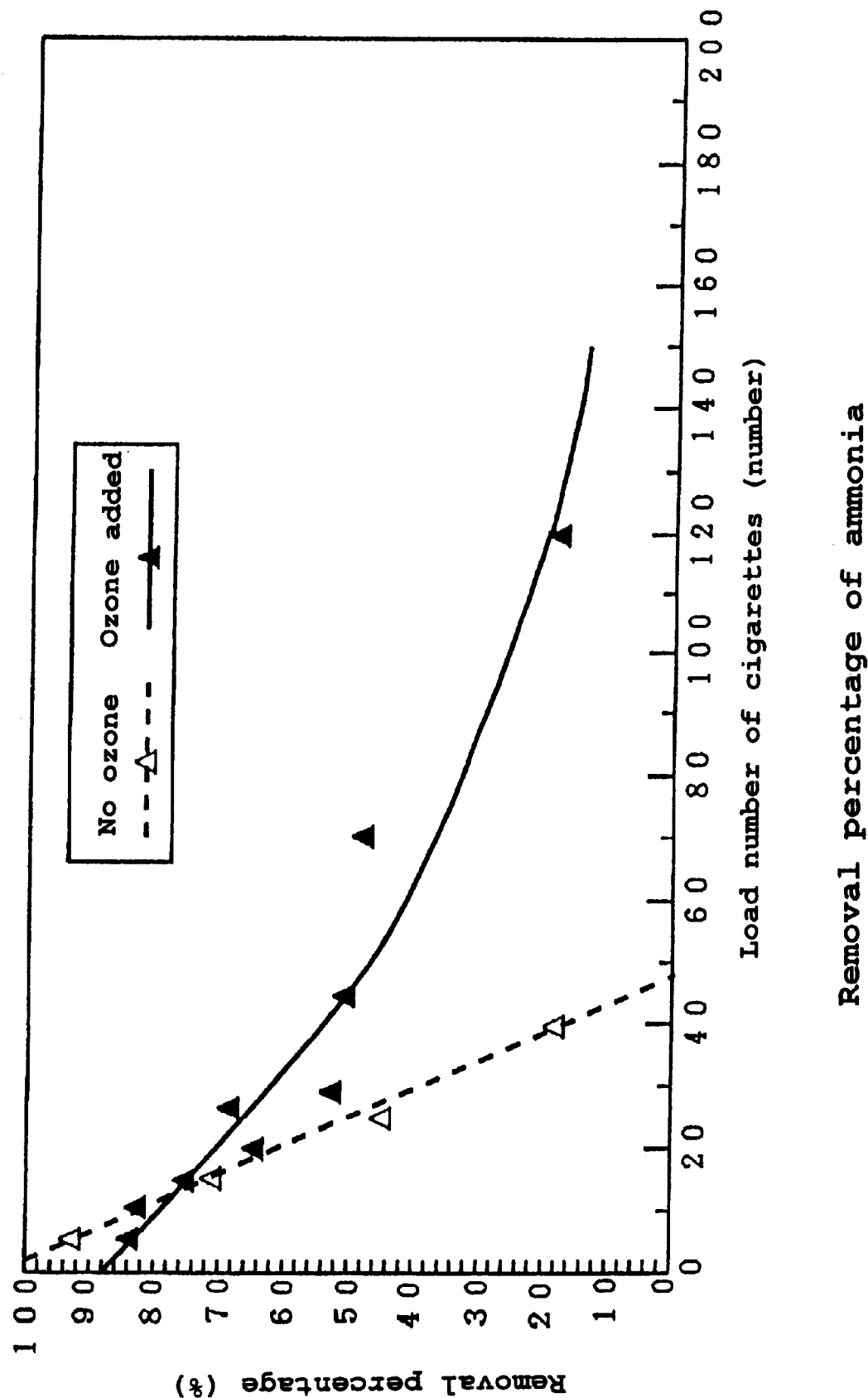
FIG. 7 is a graph showing a relation between the number of cigarettes and removal percentage of ammonia.

Here, results of measurement on removal percentages of ammonia, acetic acid and acetaldehyde under the aforementioned "B+C+$O_3$" will be described with reference to FIGS. 7 to 9. FIG. 7 is a graph showing a result of measurement on removal percentage of ammonia when ozone gas was added to cigarette smoke. A number of cigarettes is set on the abscissa axis and removal percentage of ammonia is set on the ordinate axis. Then, a case in which ozone existed indicated by the solid line and a case in which no ozone existed indicated by the broken line are compared in this Figure.

As evident from this measurement result, in a case when ozone existed, a sufficient removal percentage of ammonia was assured even when the number of cigarettes was large, as compared to a case when no ozone existed. Particularly when the number of cigarettes exceeded 50, in the case when no ozone existed, ammonia could hardly be removed. On the other hand, in the case when ozone was added, even when the number of cigarettes exceeded 50, a sufficiently high removal percentage of ammonia could be obtained.

Figure 8:
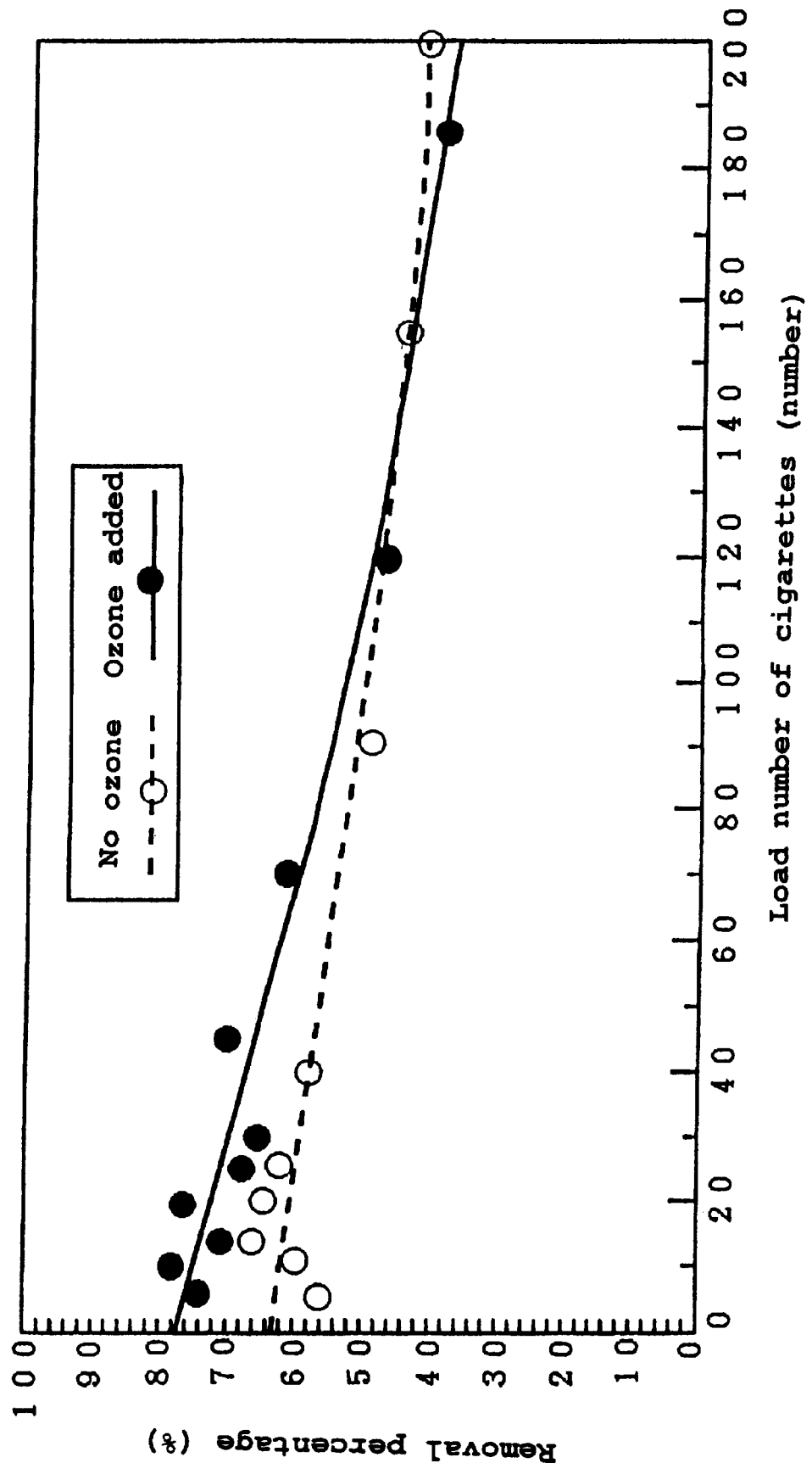
FIG. 8 is a graph showing a relation between the number of cigarettes and removal percentage of acetic acid.

FIG. 8 shows a result of measurement on removal percentage of acetic acid when ozone gas was added in the same manner as the result of measurement shown in FIG. 7. A number of cigarettes is set on the abscissa axis and removal percentage of acetic acid is set on the ordinate axis. A case when ozone was provided, indicated by the solid line and a case when no ozone was provided indicated by the broken line are compared in this Figure. As evident from this measurement result, when ozone was provided, a sufficient removal percentage of acetic acid could be obtained as compared to the case when ozone was not provided. Particularly when the number of cigarettes did not exceed 140, a higher removal percentage of acetic acid could be obtained when ozone was added than when no ozone was added.

Figure 9:
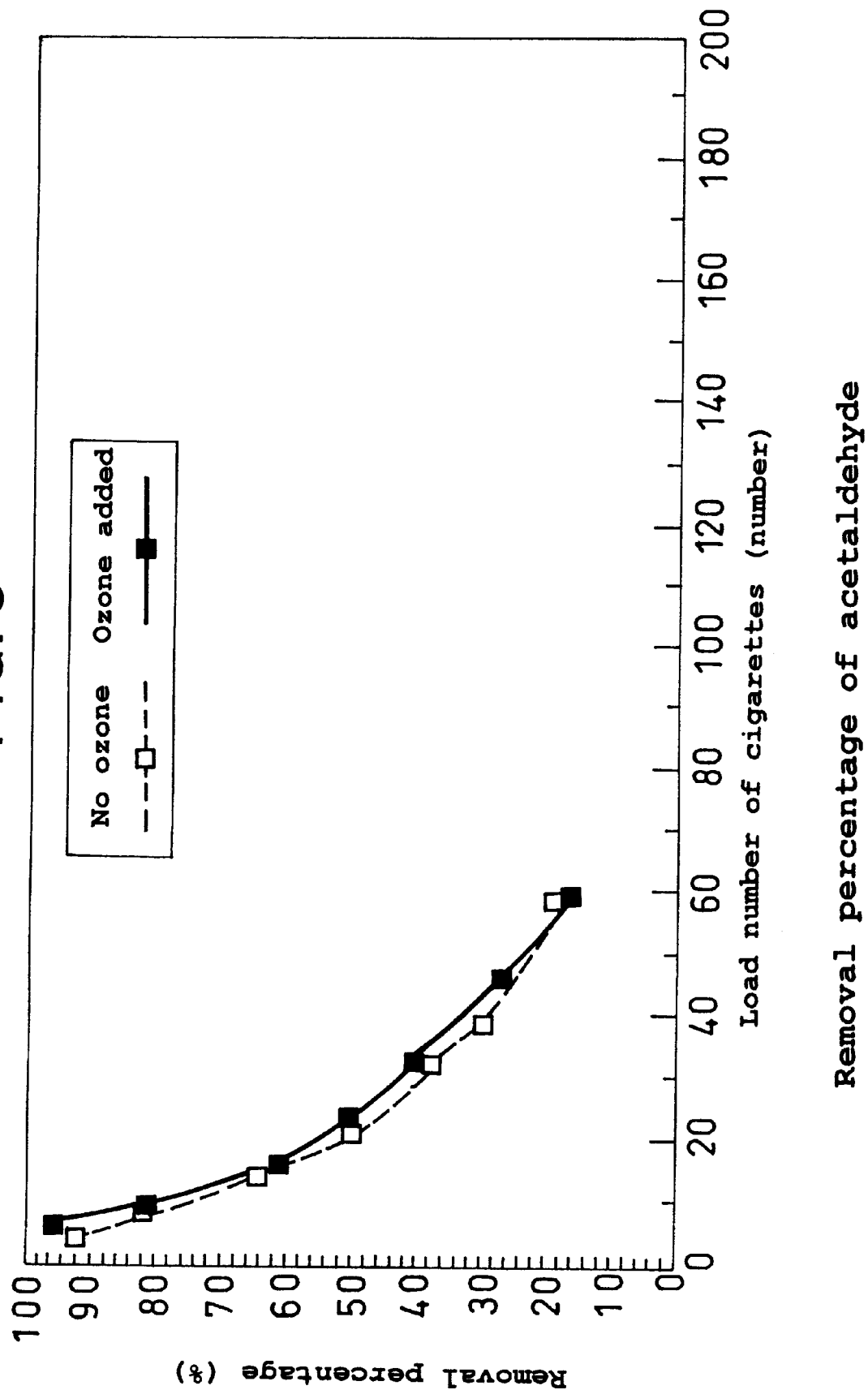
FIG. 9 is a graph showing a relation between the number of cigarettes and removal percentage of acetaldehyde.

FIG. 9 shows a result of measurement on removal percentage of acetaldehyde when ozone gas was added like the result of measurement of FIG. 7. Removal percentage of acetaldehyde is set on the ordinate axis. Although according to the result of this measurement, no large difference was found between when ozone was added and when no ozone was added, a slightly better result was noticed when ozone was added.

Figure 10:
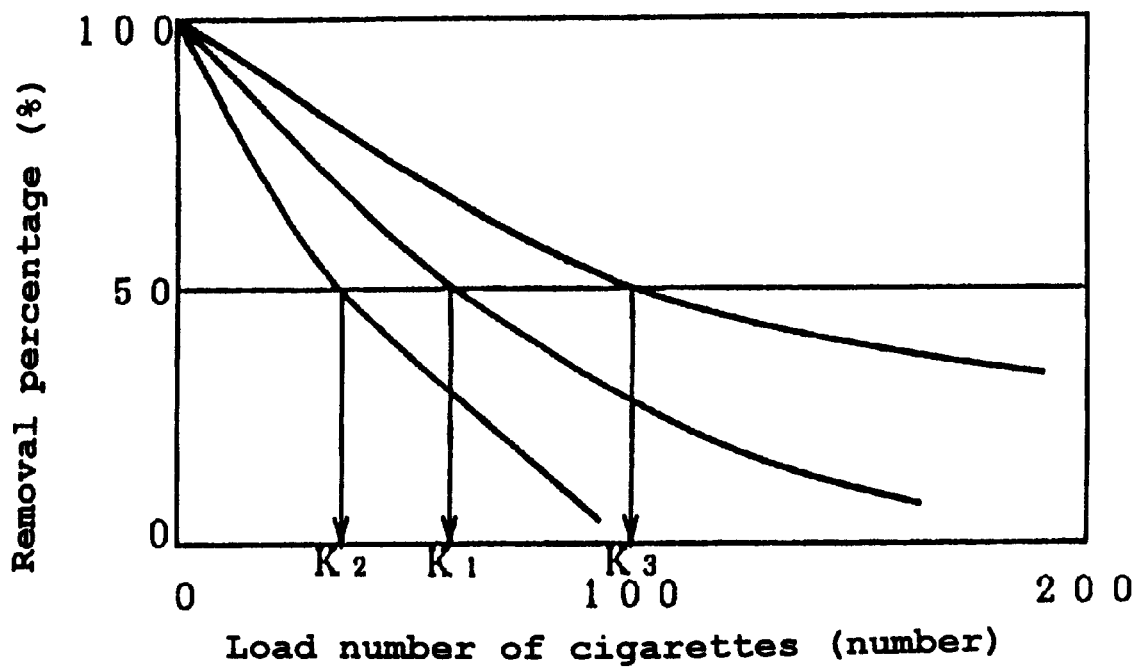
FIG. 10 is a diagram showing a calculation for the number of total durable number of cigarettes.

Then, referring to FIG. 10, a durable number of cigarettes for the air cleaning apparatus according to this embodiment will be described. FIG. 10 shows a relation between the load number of cigarettes and removal percentage based on an experiment under the following condition. Whereby a durable number thereof is calculated and this durable number thereof is regarded as a service life for the replacement of the activated charcoal filter.

As for the experiment condition, 10 pieces of MILD SEVEN (trade mark) cigarettes were burnt as a pollution component by a smoking machine in a 1 m³ acrylic box. As for a measuring device, sensor tubes corresponding to each of ammonia, acetaldehyde and acetic acid were used. In this measurement, the air cleaning apparatus provided with a sample was operated for 30 minutes and the removal percentages for the respective components were calculated according to concentrations before and after the operation. In a graph shown in FIG. 10, the load number of cigarettes was set on the abscissa axis and the removal percentage was set on the ordinate axis, so that curves indicating ammonia removal percentage, acetaldehyde removal percentage and acetic acid removal percentage were obtained. Intersections of each of the curves at removal percentage 50% were obtained as $K_1$, $K_2$ and $K_3$. $K_1$ indicates a durable number for ammonia, $K_2$ indicates a durable number for acetaldehyde and $K_3$ indicates a durable number for acetic acid. Then, as shown in FIG. 10, $K_1$, $2 \times K_2$ and $K_3$ are summed up and then divided by 4 so as to obtain a value K indicating a total durable number of cigarettes. By calculating such the total durable number and assuming this to be a service life of the filter, the service life of the activated charcoal filter can be estimated securely. A microcomputer loaded on a vehicle can calculate according to the formula. As a result, when the total durable number is reached, a indication lamp for the activated charcoal filter replacement may blink or the like thereby making it possible to inform of a replacement period of the activated charcoal filter. Also, the reason why $K_2$ is doubled is that, because human sense to acetaldehyde is keen, a corresponding weight is added, taking that fact into account.

Further, according to the calculation formula for the total durable number thereof, the total durable numbers were calculated about a case in which no ozone was added and a case in which the diffusing plate 9 was not used. As a result, according to this embodiment, a sufficiently high value could be obtained. That is, the service life of the activated charcoal filter could be extended as compared to a conventional apparatus.

Figure 11:
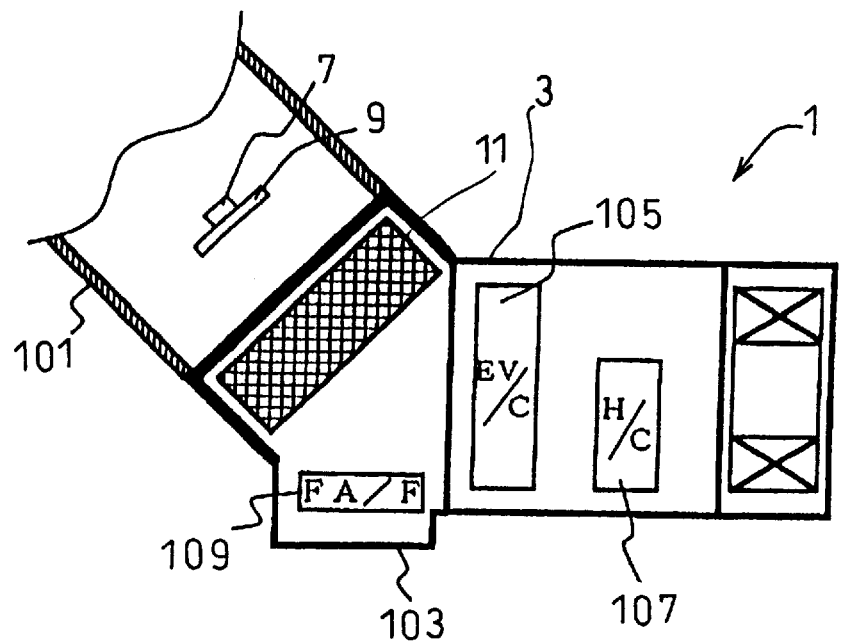
FIG. 11 is a sectional view of an air conditioning duct according to a modification of the embodiment shown in FIG. 1.

The present invention is not restricted to the above described embodiments but may be modified in various ways within a range not departing from a spirit of the present invention. For example, as shown in FIG. 11, in an air conditioning duct 3 comprising a circulation port 101 for air in a compartment and an outside air intake port 103, the filter according to the present invention may be provided in the circulation port 101. Also, referring to FIG. 11, reference numeral 105 denotes an evaporator, reference numeral 107 denotes a heater and reference numeral 109 denotes an outside air intake fan.

Figure 12:
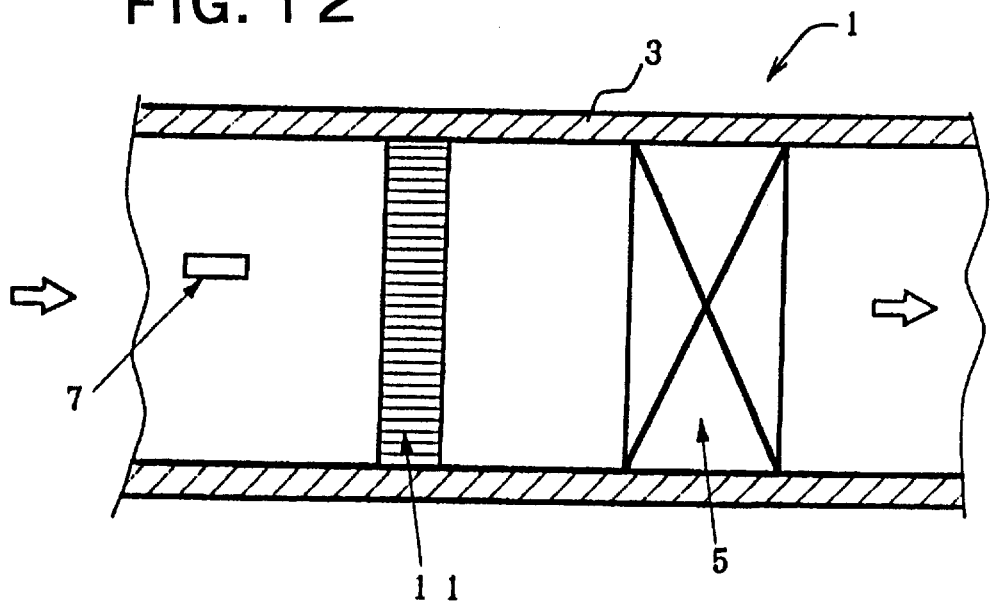
FIG. 12 is a sectional view of the air conditioning duct according to another modification.

Even in a case when the diffusing plate is not disposed between the ozone generator 7 and the activated charcoal filter 11 as shown in FIG. 12, bad odor of smoking can be sufficiently deodorized. However, from a viewpoint for prolonging the service life of the activated charcoal filter 11, as described above, it is preferable to provide the diffusing plate.

Further, it is permissible to provide a dust arrestor in the upstream side of the activated charcoal filter so as to prevent contaminant from adhering to the activated charcoal. In this case, adhesion of contaminant to the activated charcoal can be prevented, so that the service life of the activated charcoal filter can be prolonged.

Figure 13:
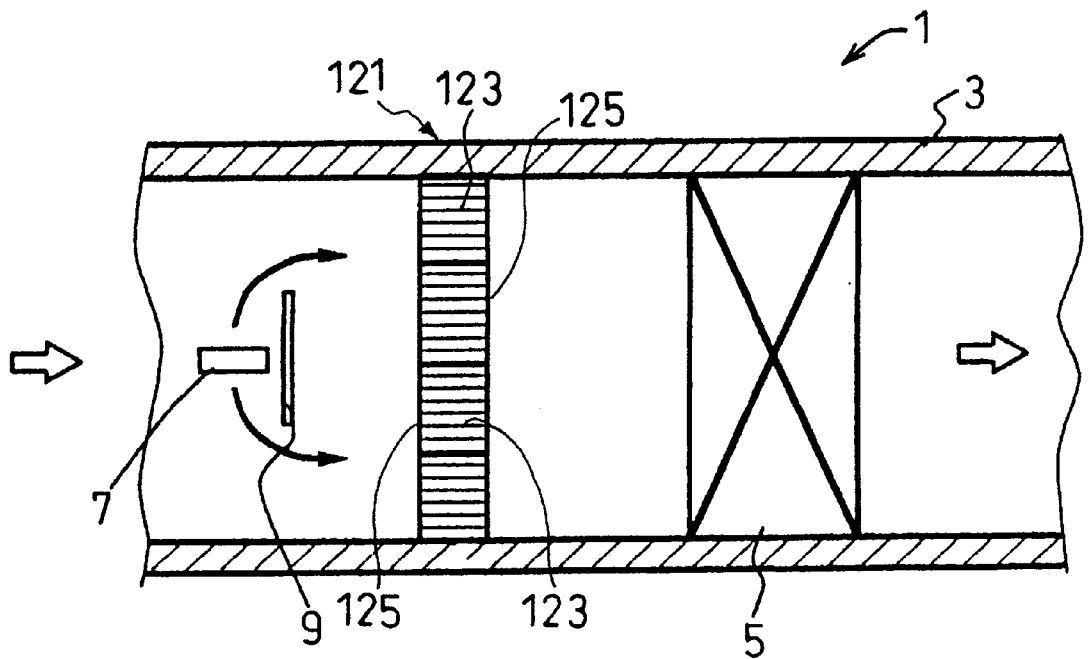
FIG. 13 is a sectional view of the air conditioning duct according to still another modification.

Further, it is permissible to divide the activated charcoal filter to a plurality of blocks so that each of the respective blocks has acid activated charcoal and alkali activated charcoal. That is, as shown in FIG. 13, the activated charcoal filter 121 may be formed by combining an alkali treated activated charcoal block 123 containing alkali treated activated charcoal and an acid treated activated charcoal block 125 containing acid treated activated charcoal alternately.

Figure 14:
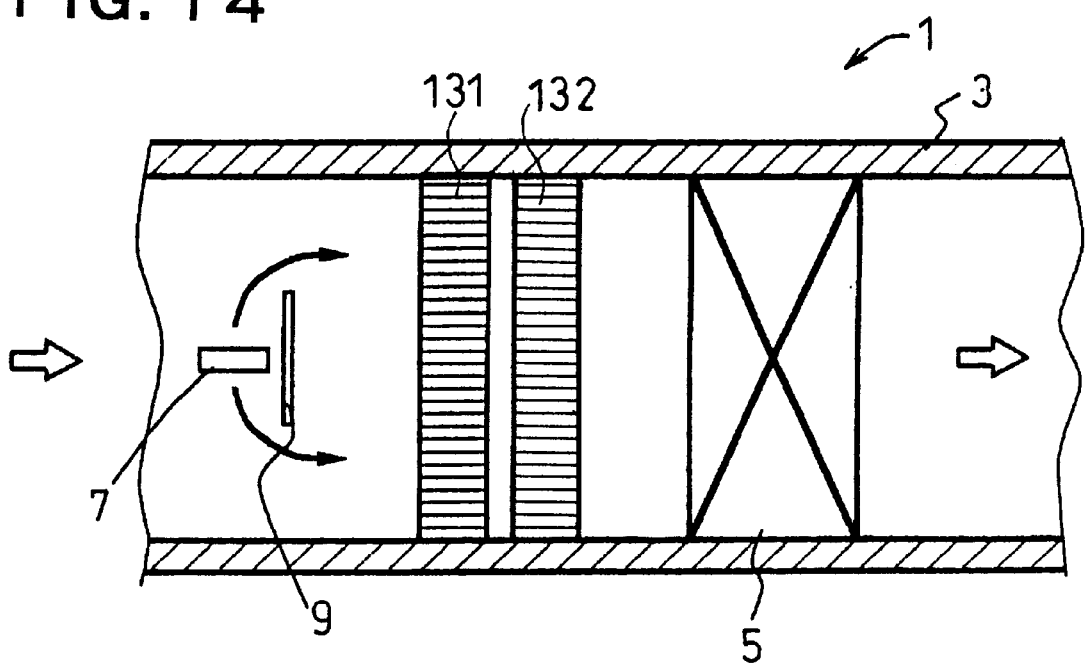
FIG. 14 is a sectional view of the air conditioning duct according to a further modification.

Although in the first embodiment, a single activated charcoal filter 11 is installed in the air conditioning duct, it is permissible to provide a plurality of the activated charcoal filters. For example, as shown in FIG. 14, it is permissible to dispose two activated charcoal filters 131 and 132 sequentially in the direction of air flow in the air conditioning duct 3 such that one activated charcoal filter 131 contains acid activated charcoal and the other activated charcoal filter 132 contains alkali activated charcoal. In this case also, it is evident that the same effect as in the first embodiment is exerted.

What is claimed is:

1. An air cleaning apparatus for vehicles, said apparatus comprising:

an air passage;

an ozone generator disposed in said air passage; and an activated charcoal filter disposed on a downstream side of said ozone generator in said air passage;

said activated charcoal filter containing acid activated charcoal which includes activated charcoal that has been immersed in an acid reagent; and said activated charcoal filter containing alkali activated charcoal which includes activated charcoal that has been immersed in an alkali reagent.

2. The air cleaning apparatus according to claim 1, wherein said apparatus further comprises diffusing means for diffusing generated ozone in the air passage, said diffusing means being disposed in the downstream side of the ozone generator and in an upstream side of the activated charcoal filter.

3. The air cleaning apparatus according to claim 2, wherein said diffusing means is a plate member having a plurality of holes.

4. The air cleaning apparatus according to claim 1, wherein the activated charcoal filter contains a first layer having alkali activated charcoal and a second layer containing acid activated charcoal.

5. The air cleaning apparatus according to claim 4, wherein the first and second layers have alkali activated charcoal and acid activated charcoal bonded to each of surfaces of substrates thereof.

6. The air cleaning apparatus according to claim 4, wherein the activated charcoal filter includes through portions extending in a direction of air flow.

7. The air cleaning apparatus according to claim 5, wherein the activated charcoal filter is formed by overlaying combinations of a flat shaped substrate and a corrugated substrate disposed on a main surface of said flat shaped substrate so as to form the through portions between said flat substrate and said corrugated substrate, in the form of plural strata.

8. The air cleaning apparatus according to claim 4, wherein the activated charcoal filter has a honey-comb structure.

9. The air cleaning apparatus according to claim 1, wherein the activated charcoal filter is formed of a combination of a first block containing acid activated charcoal and a second block containing alkali activated charcoal.

10. The air cleaning apparatus according to claim 1, wherein the activated charcoal filter is formed by bonding a mixture of acid activated charcoal and alkali activated charcoal to a surface of a substrate thereof.

* * * * *